United States Patent [19]
Pryor

[11] 4,422,753
[45] Dec. 27, 1983

[54] MULTICHANNEL MASKING CAMERA AND PROJECTOR

[76] Inventor: Paul L. Pryor, 10 Lonsdale Ave., Dayton, Ohio 45419

[21] Appl. No.: 324,999

[22] Filed: Nov. 25, 1981

[51] Int. Cl.³ .................... G03B 27/52; G03B 27/70
[52] U.S. Cl. .................................. 355/43; 355/32; 355/45
[58] Field of Search ............... 355/43, 71, 65, 66, 355/32, 26, 39, 50, 45

[56] References Cited

U.S. PATENT DOCUMENTS

| 2,273,112 | 2/1941 | Kleinhenz | 355/32 |
| 3,085,469 | 4/1963 | Carlson | 355/37 |
| 3,185,026 | 5/1965 | Carlson et al. | 355/66 X |
| 4,206,997 | 6/1980 | Licciardi | 355/39 |
| 4,264,192 | 4/1981 | Robb | 355/32 |

Primary Examiner—Richard A. Wintercorn
Attorney, Agent, or Firm—Carl A. Stickel

[57] ABSTRACT

An optical imaging system for producing and applying image masks consisting of an original object holder, a lens and prism associated with the object holder for producing multiple images, recording means for these images, means for maintaining these recorded images or masks in precise register with the original object and each other and means of illuminating the recorded images for projection back through the optical system onto the original object. This optical imaging apparatus directs light from a scene located in a plane of multiple image planes where images differing in contrast, density, color content, and so forth, are produced and where means are provided for recording the images. These images are processed either in situ or apart from the apparatus as positives or negatives. The processed images are then placed or remain in their original positions, illuminated and reimaged back to the original object space. By modifying the reimaging illumination in intensity and/or color the combined images thus produced serve as both mask and illumination for modifying the original image or scene. This modified original image can then be recorded by photographic film or paper and other ray recording devices.

3 Claims, 8 Drawing Figures

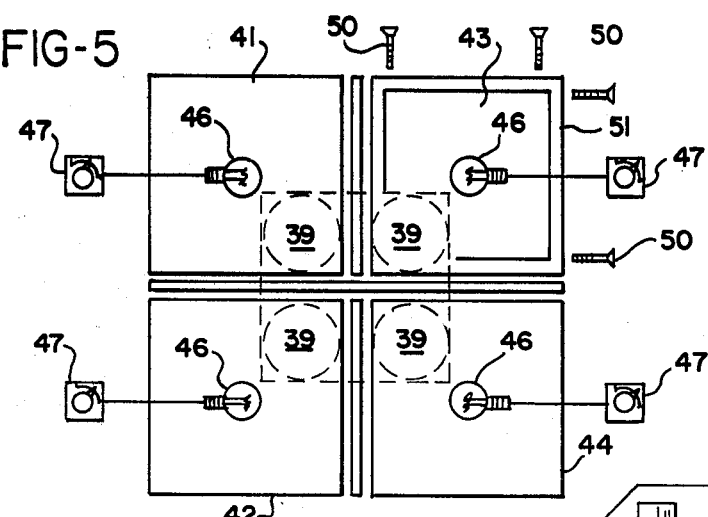
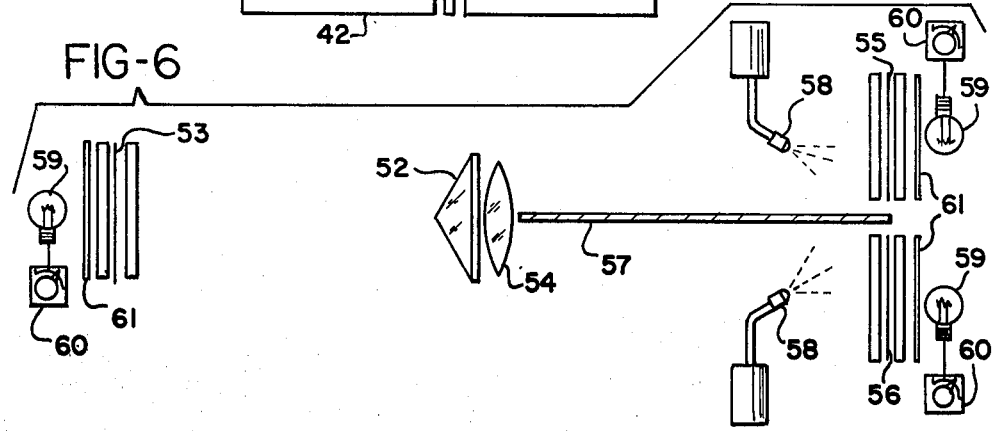
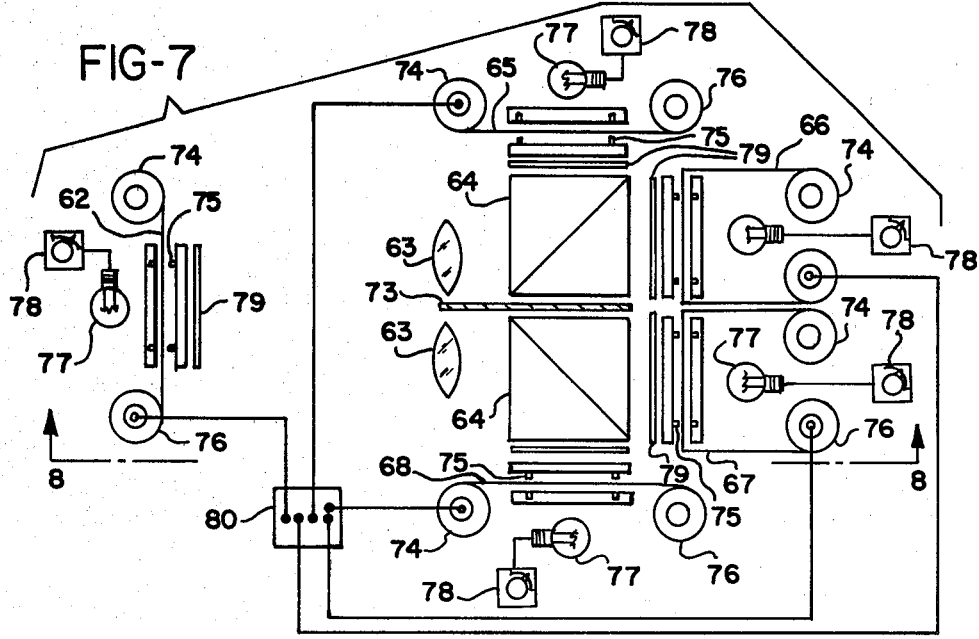

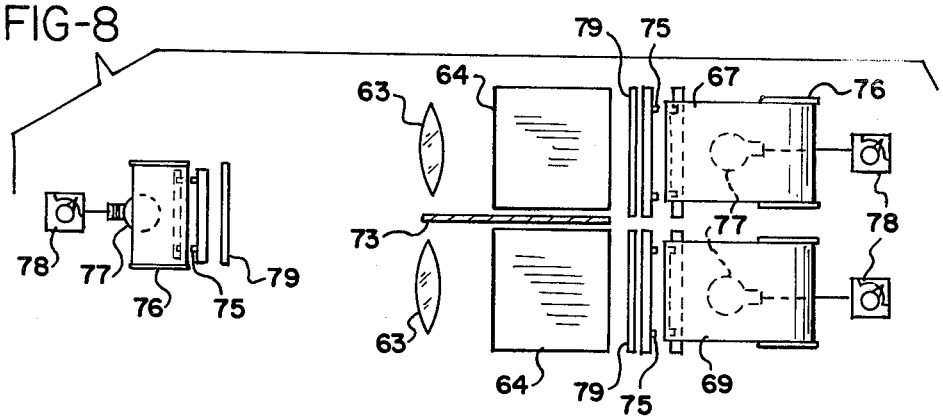

MULTICHANNEL MASKING CAMERA AND PROJECTOR

BACKGROUND AND OBJECTS OF THE INVENTION

Masking is a well known technique in Photography and Cinamatography wherein a light transmitting image is made and used in conjunction with another image in order to enhance the final result. The following processes can and often utilize image masking in one form or another; contrast enhancement, contrast reduction, background dubbing, foreground addition, photo version of "chroma cueing", many "special effects", image combining, improving fine detail, false color enhancement, color correction for compensating printing ink or dyes, as well as improving the quality of faded images, and so forth. In fact, the very popular dodging of enlargements and contact prints can be considered as a form of masking in which the mask is positioned well out of the focal plane. Many techniques involved in producing "posturized" pictures can also be thought of as utilizing photo masks.

Photographic masks can be sharp of the in-focus type or unsharp of the out-of-focus type. They can be positive or negative, continuous tone or single tone, opaque or semi-opaque, black and white or color and are most often used in register with the image to be enhanced.

Masks are usually made from or in conjunction with the image being enhanced, however, masks can also be made by hand and/or from suitable materials or pigments.

In many cases, these masks are used in printing in a one-step subtractive manner in which the masks selectively remove from the picture being enhanced some of the light normally transmitted while it is being printed. In an additive mode, the mask often removes all of the light from the selected areas of the picture and in a subsequent multiple exposure these areas are exposed in connection with another picture combined with a complimentary opaque mask.

One of the short comings of the above techniques, is that the final enhanced result is often not known until the final image has been recorded and processed. This is particularly true when working from negatives to positives. It is also true when working with a multistep additive process. Another difficulty with masking techniques as utilized today is that often there is very little control over the final result except to remake the mask. Another limitation is that most masking techniques are limited to the use of only one mask at a time. Also, the problem of image registration often presents difficulties.

The following multichannel masking technique and equipment will overcome the above difficulties and provide a tool for producing other special effects more economically than computer operated laser printers and more conveniently than the usual darkroom techniques.

An object of the present invention is to provide an improved image enhancement apparatus for use in producing improved enhanced Photography and Cinamatography.

Another object of the invention is to provide an apparatus for controlling the enhancement of images while one is observing the results of the enhancement before recording the resulting image.

Another object of the invention is to provide a masking system with improved precision image registration.

Still another object of the invention is to provide a multichannel combined imaging and projection system for the production of special photo effects.

Another object of the invention is to provide an improved multi-imaging system in which several images are combined and precisely registered to provide enhanced images and special effects.

A further object of the invention is to provide a film holder which insures precise registration of several images, each with the other when the film is being exposed and after processing for projection of the processed film when it is returned to the identical position for projection back through the same optical system.

Yet another object of the invention is to provide an imaging system with "in situ" processing and means for projecting an image back through the same optical system in order to insure precise image registration for precise masking and special effects.

Other objects and advantages will appear as the following detailed description proceeds.

BRIEF DESCRIPTION OF THE DRAWINGS

FIG. 5 is a diagrammatic view taken along the line 5—5 transversely of FIG. 4.

FIG. 6 is a diagrammatic view of a two-channel embodiment of this invention involving a doubling prism and a single lens capable of producing precise enhanced images.

FIG. 7 is a diagrammatic view to illustrate how the four-channel system in FIGS. 4 and 5 can be utilized to produce an eight-channel system by adding four beam splitting prisms such as shown in FIG. 1. FIG. 7 also illustrates the adaptation of this invention to a motion picture optical printer.

FIG. 8 is a diagrammatic view taken along the line 8—8 transversely of FIG. 7.

DESCRIPTION OF THE PREFERRED EMBODIMENTS

Figure 1:
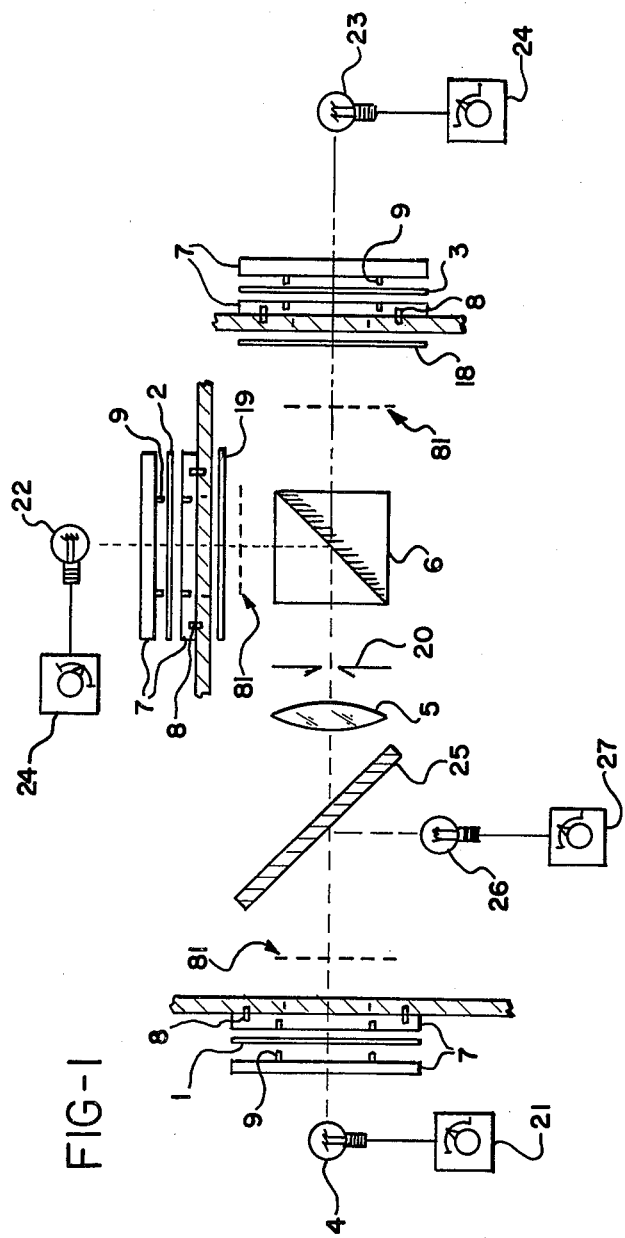
FIG. 1 is a diagrammatic view of one form of the imaging and projection apparatus embodying principles of the invention which apparatus may be used in practicing this invention.

This invention relates to methods and devices for producing and combining photo-type images in precise registration so as to improve and enhance the final image, for example, masking an image to reduce or increase contrast and improve the rendition of fine detail. Other usages will become obvious to one skilled in the art as the description proceeds. For one embodiment of this invention, a two-channel system, the arrangements of parts and their operation will now be explained. Referring to FIG. 1, we start with the primary original scene or object at 1. This primary object can be a transparency, real object, or image (either virtual or real) produced by an optical system. For purposes of this description, a transparency 1 will be used as an example. This transparency at 1 is illuminated for purposes of reimaging at locations 2 and 3 by light source 4. Other illumination systems may be used in the operation of this invention. Multiple images of transparency 1 through the transmission of light rays are formed at positions 2 and 3 by lens 5 and beam splitting prism 6. Other means for producing multiple images are shown in FIGS. 3-8. The light rays from the primary scene is considered to be in the primary channel until it is divided by prisms, mirrors or multiple lenses, etc., and then the light rays forming each secondary image is considered to be a secondary channel in these multichannel systems.

A photo-sensitive surface, such as a conventional silver halide photographic film is placed at positions 2 and 3. The holders for the film are shown in FIG. 2.

Other types of photo-sensitive media which may be incorporated are non-silver halide films such as diazo or 3M films, which are processed in situ by gas or heat, electrostatic photographic processes which could also be processed without the necessity of a darkroom, electrooptical images involving such processes as liquid crystal techniques which can be processed electronically and finally in fact any type of unconventional imaging process. In the example being described here, a conventional photographic film or plate is placed at positions 2 and 3 by means of film or plate holder 7, shown in detail in FIG. 2 and described later. Other means of transporting film, plates, or photo-sensitive surfaces to the positions 2 and 3 so that they are in register one with each other are well known to one trained in the art.

Positioning images and film so that they maintain precise registration one with the other is very important and many devices and techniques are possible to obtain this, such as mechanical movements of the image planes around any or all six degrees of freedom. In the present case, care in construction to maintain image planes precisely perpendicular to the optical axis and at properly precise distances does much to achieve precise image registration. Registration pins 8 on the camera body engage holes or recesses in the film or plate holder (see FIG. 2) at the interface to provide a precise means for returning the plate or film holder to precisely the same position each time it is returned to the apparatus. Registration pins 9 (FIG. 1), 13 (FIG. 2) in one part of the film or plate holder fitting into positioning holes in the film or plate and into the other part of the holder to insure that the film or plate upon return is precisely positioned in the proper place after processing. The film or plate 10 (FIG. 2) fits in between the two parts of the holder 7 at positions 1, 2 and 3 (FIG. 1).

Figure 2:
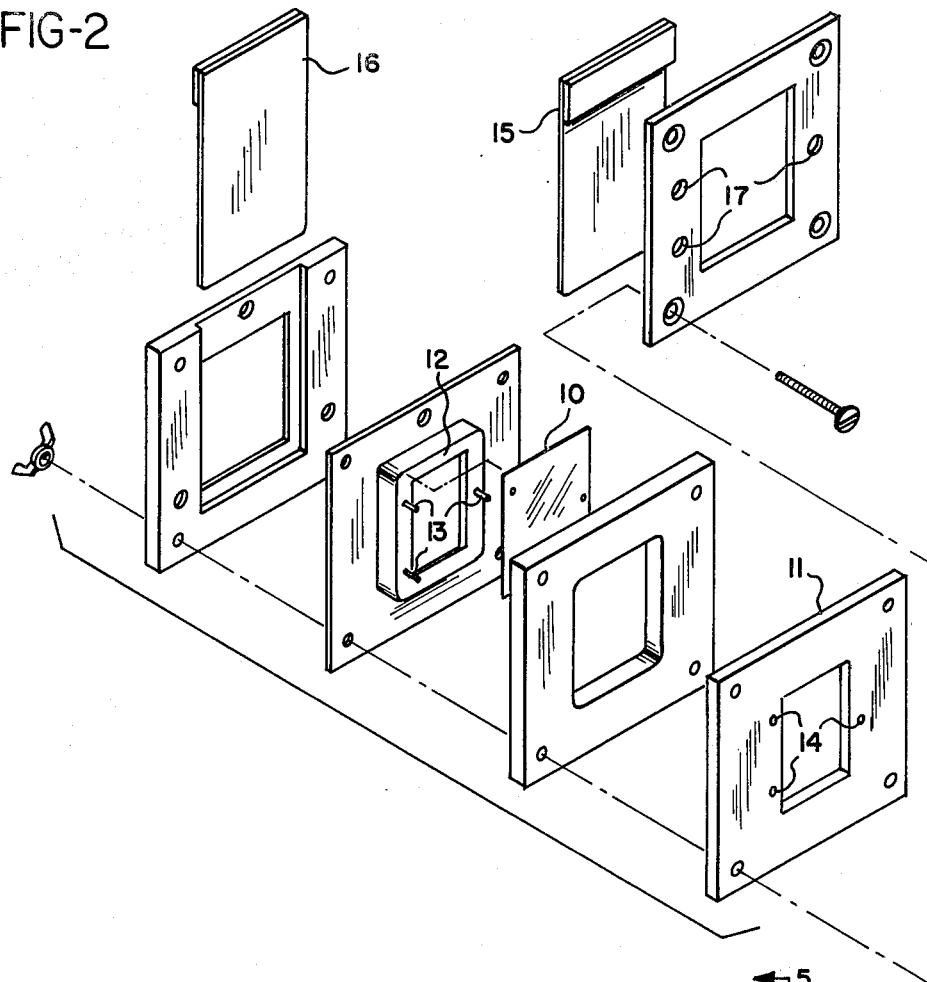
FIG. 2 is an exploded view in perspective of one piece of equipment used in placing a sensitized surface in and out of the image plane in registration with other images.

Referring now to FIG. 2, we see in detail how this is accomplished. The film or plate 10 is held against the surface of plate 11 by element 12 which contains registration pins 13 that go through corresponding positioning holes in the film and fit precisely into the holes or recesses 14 in the plate 11, thus preventing any lateral movement. Loading of the film holder 7 is usually done in a darkroom and dark slides or opaque shields 15 and 16 are both inserted in the holder 7 on opposite sides of the film or plate 10. The two principle parts of the film holder 7 are held together by four bolts or other means while outside the darkroom. Registration with the image plane at positions 2 and 3 in FIG. 1 is further insured by the registration holes or recesses 17 which precisely engage registration pins 8 on a camera projector described in FIG. 1. The dark slide 15 is removed for exposing the film and inserted for removal to the darkroom. The film is removed and after processing the film is again placed on the registration pins 13, the film holder is closed and again placed on the camera projector registration pins and both dark slides are removed to permit illumination and projection of the image.

The images at positions 2 and 3 of FIG. 1 are exposed by controlling the time, intensity and color of the light at 4. Filters at positions 18 and 19 coupled with lens aperture 20 at lens 5 and light source 4 as well as the reflecting surface of prism 6 determines the relative quality and intensity of the light at images 2 and 3. Exposure time can be controlled by shutter such as 81 anywhere in the primary channel and/or secondary channels. Exposure can also be controlled by a control device 21 controlling the intensity and duration of the illumination from the light source 4.

Practically any kind of light sensitive image forming process may be involved in this invention by placing the light sensitive surface and finished image at the image planes 2 and/or 3. With some processes it is necessary to remove the exposed surface from positions 2 and 3 for processing either chemically, electrically or by heat or other means. In some cases, it is possible to process the image in situ (see FIG. 6) without disturbing the positional relationships of the images at 1, 2 and 3 with respect to the final processed images thus insuring registration of all images without resorting to registration pins, reference surfaces and so forth.

The processed images produced at 2 and/or 3 can be most conveniently thought of as transparent to be illuminated by light sources 22 and 23 which are controlled in time and/or intensity by controlling devices 24 and 25. The light source 4 and controlling device 21 at position 1 are only used while exposing the masks. It is not necessary for some operations that images be at both positions 2 and 3 nor is it necessary in some applications that the images at 2 and/or 3 be transparent. They could be reflective type images illuminated from the front rather than the rear. It is also possible that they could be self-illuminated images produced electronically such as a cathode ray tube like those used in television, or other display tubes such as plasma arcs and so forth. It is also not necessary that the images produced at 2 and/or 3 be produced from the original scene at position 1. Upon projection the images at 2 and 3 act as masks controlling and enhancing the images at 1. Further control of the image at 1 can be enhanced or achieved by modifying or changing the filters 18 and 19.

It is also possible to do additive masking by placing the original scene at either position 2 or 3 rather than 1 and placing the masking film at either the 2 or 3 position. A mask can be made by placing a retroreflector, a mirror, or a diffuse reflector and so forth at position 1 instead of a transparency (see FIG. 4). In this mode of operation after processing and illumination by light sources 22 and 23 the additively combined images of 2 and 3 appear at image plane 1 to be viewed or recorded by any applicable means. It therefore follows that by such means as lights 22 and 23, filters 18 and 19, the mask or masks at 2 and 3 and controlling devices 24 and 27, the optical properties such as contrast, intensity and color of the projected image at 1 can be controlled.

There are numerous applications of this multichannel system well known to one experienced in the art, such as contrast control, of black and white or color photographs, adding backgrounds, posturization, chroma cueing, color correction for restoring faded color images, dodging color pictures, color pictures made from black and white originals, false color, color enhancement, rotoscope, motion picture special effects, controlling results from multi-spectral cameras, controlling wide dynamic range of brightness in photographic scenes, multi-color pictures rather than just two or three colors, adding filter effects such as diffraction grating stars, image combination, abstract color design, matt box effects, additive color printing, and so forth.

Several of the above applications require the use of more than 2 secondary channels such as illustrated in FIG. 1. Possible forms of this invention involving 2, 3, 4, and 8 channels are shown in FIGS. 3, 4, 5, 6, 7 and 8. These means and combinations of them as well as other means can also be used to produce any number of channels. An additional non-image forming channel can always be added without an image such as is shown in FIG. 1 for illuminating the object at position 1. For this option, a removable semireflective surface such as a pelicle or semireflecting mirror 25 is located between the image or film 1 and the lens 5 in FIG. 1 which semireflection surface is used to partially illuminate the image 1 by means of illuminator 26 which is controlled by controller 27.

Figure 3:
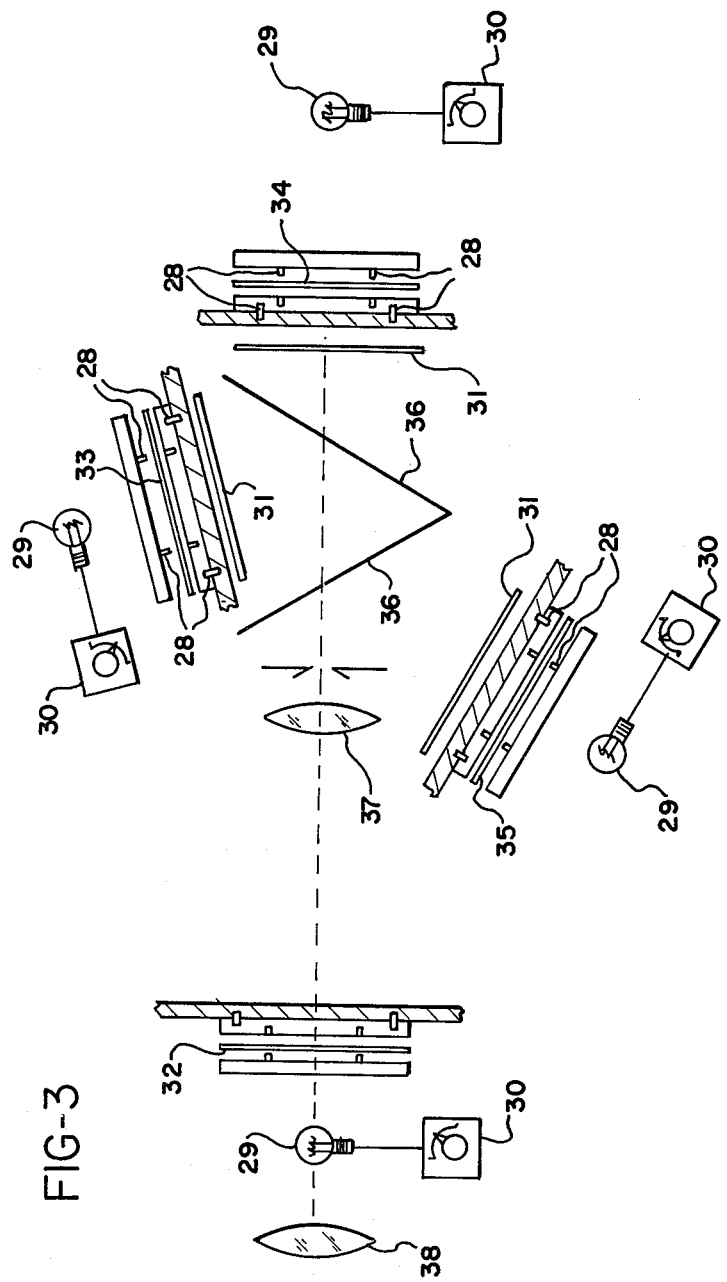
FIG. 3 is a diagrammatic view of another embodiment of this invention for producing a multiple channel system involving 3 secondary channels and capable of producing precise enhanced images.

FIG. 3 is a three-channel system and will be recognized as similar to the well known "one-shot color camera". In this invention, however, when provided with registration means, 28, illumination means, 29, and means 30 for controlling the amount of light and filters at 31 for controlling the quality of the light at the image planes 32, 33, 34, and 35 both when producing masks and in using the processed masks a new and different invention results which is the subject of this invention. The semireflecting mirrors at 36 or pellicles divide the image of 32 formed by lens 37 to form the images at 33, 34 and 35. The same mirrors recombine these images when processed and illuminated by lights 29. A removable lens at 38 can be used by removing light source 29, either for forming an image to be enhanced or for projecting an enhanced image for viewing or recording. The system is similar in operation and has all the features of the two-channel system previously described.

Figure 4:
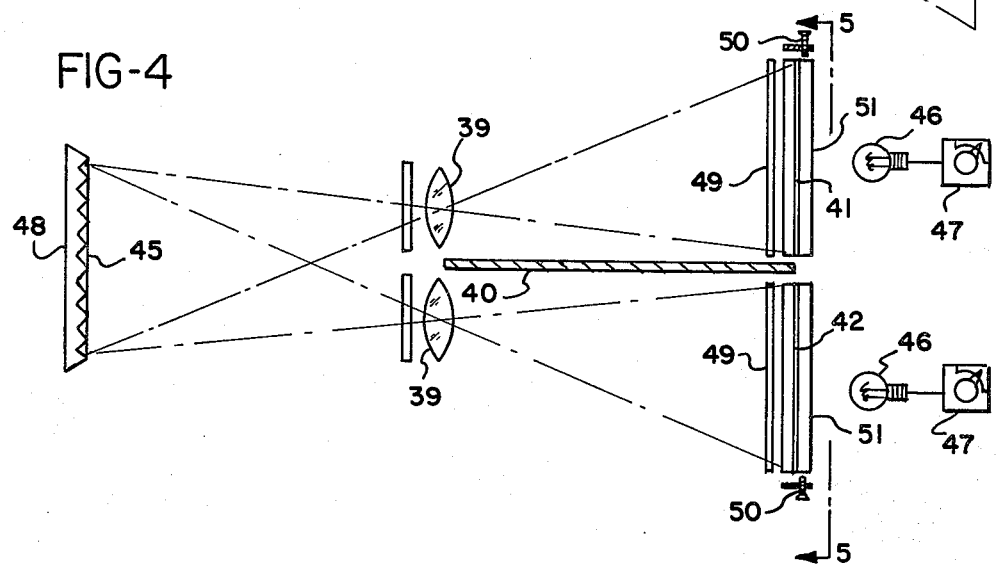
FIG. 4 is a diagrammatic view of a four-channel embodiment of this invention involving four lenses and capable of producing four masks for precise enhanced images.

FIG. 4 illustrates a four-channel system subject to all the conditions of the two and three-channel system previously described. This four-channel system is simply a four-lens system (lenses at 39) with appropriate baffles 40 to separate the four images 41, 42, 43 and 44 of the same original scene at 45. An illumination means 46 is used as in the two and three-channel systems. Illumination controls are shown at 47. Although an illumination means 46 could be used for scene 45, a retroreflector 48 is shown which can be used instead of the illuminator for a transparency at 45. This retroreflector 48 is used in making masks for additive masking when the original transparency is at either 41, 42, 43 or 44. Masks are produced at any or all of the other three positions. Filters for controlling light quality are shown at 49. In this four-channel system the registration means is shown as a set of screws 50 (four for each film or plate holder 51) for moving the film or plate in a plane perpendicular to the optical axis for translation on both X and Y axes as well as rotation. The other degrees of freedom are held constant by rigid construction of the camera and film or plate holders. Either refocusing to modify optical path length and thus magnification or changing filter glass thickness can assist in correcting out of registration due to film dimensional instability. This four-channel system is similar to the old multilens camera or a combination of two stereo cameras therefore, the original scene, if it is placed at 45, should be in a single plane in order to avoid lack of registration due to stereoscopic parralax.

FIG. 5 is a diagrammatic view taken along the line 5—5 transversely of FIG. 4 illustrating all four image planes 41, 42, 43 and 44 of FIG. 4 and how adjusting screws 50 of FIG. 4 (shown on one image only) can be used to adjust registration of all images each with the others.

Another system forming multi-images is the well known multi-faceted prism illustrated in FIG. 6. In this case, a simple prism 52 with a split front surface divides the light from the scene at 53 to form with lens 54 two images at 55 and 56. These images are separated and protected from scattered light by partition or baffle 57. This arrangement could be provided with registration means as described previously. No special registration means is required, however, if an "in situ" development means, as indicated by ammonia sprayer 58 for the diazo process, is used. The spray nozzle is located so as not to obstruct the secondary optical channel. Illumination means 59, light control means 60 and filters 61 are indicated. One version of this prism system is used in U.S. Pat. No. 2,273,112 for a color camera projector.

FIGS. 7 and 8 illustrate an eight-channel system which is primarily a four-channel system as shown in FIGS. 4 and 5 with four beam splitting prisms used in place of the one used in FIG. 1. One prism is added in each secondary channel to provide eight channels. The original scene 62 is imaged by four lenses 63 and each image is split by prisms 64 to form eight images 65, 66, 67, 68, 69, 70, 71 and 72. These images are separated and protected from scattered light by opaque partitions 73. The arrangement described in FIGS. 7 and 8 also illustrate how a registering roll film or motion picture film feed subsystem with film supply 74, mechanical registration pins 75 and take-up spool 76 could be used instead of single film holder FIG. 2. Illumination means 77, light control means 78 and filters 79 are also shown as well as synchronization means 80 for keeping all film exposures in step.

Other ways of producing multi-channel imaging systems are obvious to one skilled in the art.

It should be understood that the just described embodiments merely illustrate principles of the invention in selected preferred forms. Many modifications, additions and deletions may, of course, be made there to without departure from the spirit and scope of the invention as set forth in the following claims.

I claim:

1. A camera-projector comprising: means for producing multiple images of an original scene; means for recording at least one of the images produced; means for insuring that the produced and recorded images are in register one with the other and the original scene; means for illuminating the recorded images for projection in register back through the camera onto the original scene; means for controlling the optical properties of the projected images; said recording means including film holding means for holding film in a precise position; and positioning means for positioning shields on opposite sides of said film holding means.

2. A camera-projector comprising a body, precise means associated with the body for producing primary and secondary images of an original scene, first precise film holding means for precisely holding film in a precise position relatiave to said primary image, said body and said first holding means having means for precisely holding said first holding means and said film in a precise position relative to said primary image and said body, second precise film holding means for precisely holding a second film in a precise position relative to the secondary image, said body and said second holding means having means for precisely holding said second holding means and said second film in a precise position relative to said body and the secondary image, first feed means for feeding film through said first holding means, second feed means for feeding the second film through said second holding means, and synchronization means for said first and second feed means for synchronizing the feeding of the first mentioned and second films through the first and second film holding means.

3. A camera-projector as set forth in claim 2 in which said original scene comprises a third film, third feed means for feeding said third film through said original holding means, said synchronization means including means for synchronizing said third feed means with said first and second feed means for synchronizing the feeding of the third film with the first and second films through the third first and second holding means.

* * * * *